United States Patent
Lau et al.

(10) Patent No.: US 6,849,696 B2
(45) Date of Patent: Feb. 1, 2005

(54) LOW DIELECTRIC CONSTANT ORGANIC DIELECTRICS BASED ON CAGE-LIKE STRUCTURES

(75) Inventors: Kreisler Lau, Sunnyvale, CA (US); Feng Quan Liu, Cupertino, CA (US); Boris Korolev, San Jose, CA (US); Emma Brouk, San Jose, CA (US); Roger Leung, San Jose, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/293,024

(22) Filed: Nov. 12, 2002

(65) Prior Publication Data

US 2003/0187139 A1 Oct. 2, 2003

(Under 37 CFR 1.47)

Related U.S. Application Data

(62) Division of application No. 09/545,058, filed on Apr. 7, 2000, now Pat. No. 6,509,415.

(51) Int. Cl.[7] .............................................. C08G 81/00
(52) U.S. Cl. ....................... 525/471; 525/534; 525/539
(58) Field of Search ................................ 525/471, 534, 525/539; 526/72

(56) References Cited

U.S. PATENT DOCUMENTS

| | | | |
|---|---|---|---|
| 3,580,964 A | | 5/1971 | Driscoll et al. ............. 260/871 |
| 3,795,658 A | * | 3/1974 | Thompson .................... 528/97 |
| 5,019,660 A | | 5/1991 | Chapman et al. ............. 585/22 |
| 5,166,313 A | | 11/1992 | Archibald et al. .......... 528/344 |
| 5,347,063 A | * | 9/1994 | Shen et al. ................. 585/352 |

FOREIGN PATENT DOCUMENTS

JP         10130371         *   5/1998

OTHER PUBLICATIONS

Reichert et al., CAPLUS AN 1994:656441, 1994.*
Hasegawa et al., CAPLUS AN 1998:314774.*
PCT International Search Report for PCT/US02/21692, Jan. 17, 2003.

* cited by examiner

*Primary Examiner*—Jeffrey Mullis
(74) *Attorney, Agent, or Firm*—Bingham McCutchen; Sandra P. Thompson

(57) ABSTRACT

A low dielectric constant material has a first backbone with an aromatic moiety and a first reactive group, and a second backbone with an aromatic moiety and a second reactive group, wherein the first and second backbones are crosslinked via the first and second reactive groups in a crosslinking reaction without an additional crosslinker, and wherein a cage structure having at least 10 atoms is covalently bound to at least one of the first and second backbone.

15 Claims, 5 Drawing Sheets

LOW DIELECTRIC CONSTANT ORGANIC DIELECTRICS BASED ON CAGE-LIKE STRUCTURES

This application is a divisional of allowed application Ser. No. 09/545,058, filed Apr. 7, 2000 now U.S. Pat. No. 6,509,415.

FIELD OF THE INVENTION

The field of the invention is low dielectric constant materials.

BACKGROUND OF THE INVENTION

Interconnectivity in integrated circuits increases with decreasing size of functional elements and increasing complexity. To accommodate the growing demand of interconnections, complex configurations of conductors and insulators have been developed. Such configurations generally consist of multiple layers of metallic conductor lines embedded in multiple layers of insulators, which are fabricated from one or several low dielectric constant materials. The dielectric constant in such materials has a very important influence on the performance of the integrated circuit. Insulator materials having low dielectric constants (i.e. below 3.0) are especially desirable, because they typically allow faster signal propagation, reduce capacitive effects and cross talk between conductor lines, and lower voltages to drive integrated circuits.

One way of achieving low dielectric constants in the insulator material is to employ materials with inherently low dielectric constants. Generally, two different classes of low dielectric constant materials have been employed in recent years—inorganic oxides and organic polymers. Inorganic oxides, which may be applied by chemical vapor deposition or spin-on techniques, have dielectric constants between about 3 and 4, and have been widely used in interconnects with design rule larger than 0.25 µm. However, as the dimension of interconnects continue to shrink, materials with even lower dielectric constant become more desirable.

Since 1998 integrated circuits with 0.25 µm design rule have been in production, but will be superseded by the production of the 0.18 µm generation ICs in 1999, and materials having dielectric constants lower than 3.0 are needed immediately. As the trend to even smaller design rules continues, design rules smaller than 0.18 µm are being developed, and design rules of 0.07 µm and below can be expected in just a few generations, suggesting a strong need for dielectric materials with designed-in nanoporosity. Since air has a dielectric constant of about 1.0, a major goal is to reduce the dielectric constant of nanoporous materials down towards a theoretical limit of 1, and several methods are known in the art for fabricating nanoporous materials.

In some methods, the nanosized voids are generated by incorporation of hollow, nanosized spheres in the matrix material, whereby the nanosized spheres acts as a "void carriers", which may or may not be removed from the matrix material. For example, U.S. Pat. No. 5,458,709 to Kamezaki et al., the inventors teach the use of hollow glass spheres in a material. However, the distribution of the glass spheres is typically difficult to control, and with increasing concentration of the glass spheres, the dielectric material loses flexibility and other desirable physico-chemical properties. Furthermore, glass spheres are generally larger than 20 nm, and are therefore not suitable for nanoporous materials where pores smaller than 2 nm are desired.

To produce pores with a size substantially smaller than glass spheres, Rostoker et al. describe in U.S. Pat. No. 5,744,399 the use of fullerenes as void carriers. Fullerenes are a naturally occurring form of carbon containing from 32 atoms to about 960 atoms, which is believed to have the structure of a spherical geodesic dome. The inventors mix a matrix material with fullerenes, and cure the mixture to fabricate a nanoporous dielectric, wherein the fullerenes may be removed from the cured matrix. Although the pores obtained in this manner are generally very uniform in size, homogeneous distribution of the void carriers still remains problematic.

In other methods, the nanosized voids are generated from a composition comprising a thermostable matrix and a thermolabile (thermally decomposable) portion, which is either separately added to the thermostable matrix material (physical blending approach), or built-in into the matrix material (chemical grafting approach). In general, the matrix material is first cured and crosslinked at a first temperature $T_{XL}$ to obtain a high $T_G$ matrix, then the temperature is raised to a second temperature $T_T$ (such that $T_T<T_G$) to thermolyze the thermolabile portion, and postcured at a third temperature ($T_C$, with $T_C<T_G$) to form the desired nanoporous material having voids corresponding in size and position to the size and position of the thermolabile portion. Continued heating of the nanoporous material beyond $T_C$ will result in further annealing and stabilization of the nanoporous material.

In a physical blending approach, a thermostable matrix is blended with a thermolabile portion, the blended mixture is crosslinked, and the thermolabile portion thermolyzed. The advantage of this approach is that variations and modifications in the thermolabile portion and the thermostable matrix are readily achieved. However, the chemical nature of both the thermolabile portion and thermostable matrix generally determine the usable window among $T_{XL}$, $T_T$, and $T_G$ such that $T_{XL}<T_T<T_G$, thereby significantly limiting the choice of available materials. Moreover, blending thermolabile and thermostable portions usually allows only poor control over pore size and pore distribution.

In the chemical grafting approach, a somewhat better control of pore size and pore distribution can be achieved when thermolabile portions and thermostable portions are incorporated into a single block copolymer. The block copolymer is first heated to crosslink the matrix, further heated to thermolyze the thermolabile blocks, and then cured to yield the nanoporous material. Alternatively, thermostable portions and thermostable portions carrying thermolabile portions can be mixed and polymerized to yield a copolymer, which is subsequently heated to thermolyze the thermolabile blocks. An example for this approach is shown in U.S. Pat. No. 5,776,990 to Hedrick et al. However, the synthesis of block polymers having thermostable and thermolabile portions is relatively difficult and labor intensive, therefore adding significant cost. Furthermore, as the amount of thermolabile portions (i.e. porosity) increases, the nanoporous materials tend to collapse more readily, thus limiting the total volume of voids that can be incorporated into the nanoporous material.

Although various methods are known in the art to introduce nanosized voids into low dielectric constant material, all, or almost all of them have one or more than one disadvantage. Thus, there is still a need to provide improved compositions and methods to introduce nanosized voids in dielectric material.

SUMMARY OF THE INVENTION

The present invention is directed to low dielectric constant materials having a first backbone with an aromatic moiety and a first reactive group, and a second backbone with an aromatic moiety and a second reactive group, wherein the first and second backbone are crosslinked via the first and second reactive groups in a crosslinking reaction preferably without an additional crosslinker, and wherein a cage structure having at least 10 atoms is covalently bound to at least one of the first and second backbone.

In one aspect of the inventive subject matter first and second backbone are identical, preferably comprise a phenyl group, more preferably comprise a poly(arylene ether), and most preferably comprise a substituted resorcinol, a substituted tolane, or a substituted phenol as aromatic moiety. In other preferred aspects, the first and second reactive groups are non-identical and comprise an ethynyl moiety or a tetracyclone moiety, and the crosslinking reaction is a cycloaddition reaction.

In another aspect of the inventive subject matter the cage structure preferably comprises a substituted or unsubstituted adamantane, or substituted or unsubstituted diamantane, wherein the adamantane or diamantane may be incorporated into the backbone as a pendent group or such that the cage structure has a tetrahedral or polyhedral configuration.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
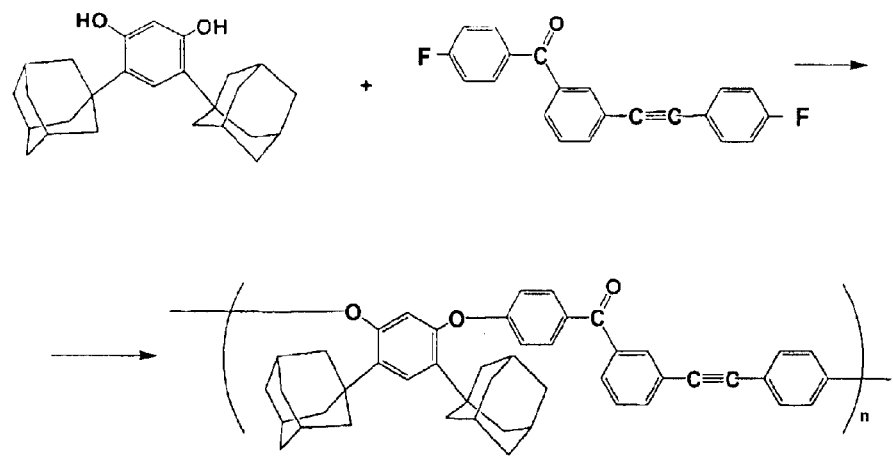
FIG. 1 is a synthetic scheme to produce a low molecular weight polymer with pendent cage structures according to the inventive subject matter.

As used herein, the term "low dielectric constant material" refers to organic, organometallic, and inorganic materials with a dielectric constant of less than 3.0. The low dielectric material is typically manufactured in the form of a thin film of less than 100 $\mu$m, however, various shapes other than a film are also contemplated under the scope of this definition, including thick films, blocks, cylinders, spheres, etc.

As also used herein, the term "backbone" refers to a contiguous chain of atoms or moieties forming a polymeric strand that are covalently bound such that removal of any of the atoms or moiety would result in interruption of the chain.

As further used herein, the term "reactive group" refers to any atom, functionality, or group having sufficient reactivity to form at least one covalent bond with another reactive group in a chemical reaction. The chemical reaction may take place between two identical, or non-identical reactive groups, which may be located on the same or on two separate backbones. It is also contemplated that the reactive groups may react with one or more than one exogenous crosslinking molecule to crosslink the first and second backbones. Although crosslinking without exogenous crosslinkers presents various advantages, including reducing the overall number of reactive groups in the polymer, and reducing the number of required reaction steps, crosslinking without exogenous crosslinkers has also a few detriments. For example, the amount of crosslinking functionalities can typically be no more adjusted. On the other hand, employing exogenous crosslinkers may be advantageous when the polymerization reaction and crosslinking reaction are chemically incompatible.

As still further used herein, the term "cage structure" refers to a molecule having at least 10 atoms arranged such that at least one bridge covalently connects two or more atoms of a ring system. The bridge and/or the ring system may comprise one or more heteroatoms, and may be aromatic, partially saturated, or unsaturated. Further contemplated cage structures include fullerenes, and crown ethers having at least one bridge. For example, an adamantane or diamantane is considered a cage structure, while a naphthalene or an aromatic spirocompound are not considered a cage structure under the scope of this definition, because a naphthalene or an aromatic spirocompound do not have one, or more than one bridge.

In a preferred low dielectric constant material, the first and second backbone comprise a poly(arylene ether) with two pendent adamantane groups, respectively, as cage structures as shown in Structures 1A–B (only one repeating unit of the backbone is shown). The first and second aromatic moieties comprise a phenyl group, and the first and second reactive groups are an ethynyl and a tetracyclone moiety, respectively, which react in a Diels-Alder reaction to crosslink the backbones. Preferred crosslinking conditions are heating the poly(arylene ether) backbones to a temperature of about 200° C.–250° C. for approximately 30–180 minutes. Structure 1B can be synthesized as generally outlined in Example 1 below.

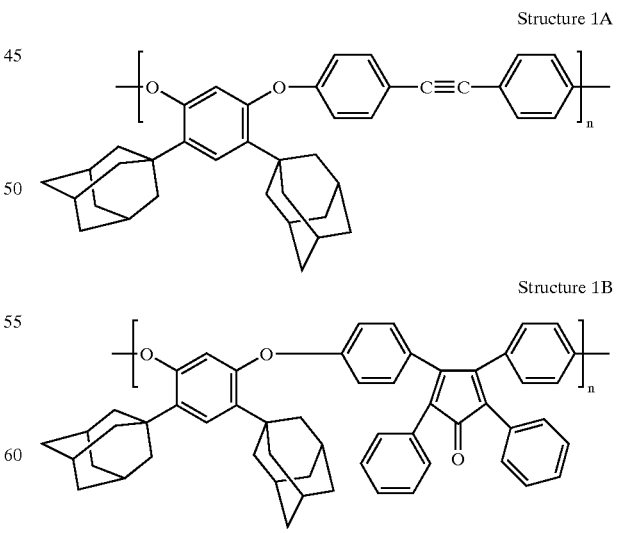

Structure 1A

Structure 1B

In alternative embodiments, the backbone need not be restricted to a poly(arylene ether), but may vary greatly depending on the desired physico-chemical properties of the final low dielectric constant material. Consequently, when relatively high $T_G$ is desired, inorganic materials are especially contemplated, including inorganic polymers comprising silicate ($SiO_2$) and/or aluminate ($Al_2O_3$). In cases where flexibility, ease of processing, or low stress/TCE, etc. is required, organic polymers are contemplated. There are many different appropriate organic polymers, and some of the polymers may be especially suited for one purpose (e.g. low thermal coefficient of expansion), while other polymers may be especially suited for other purposes (e.g. superior gap filling capability). Thus, depending on a particular application, contemplated organic backbones include aromatic polyimides, polyamides, and polyesters.

Figure 2:
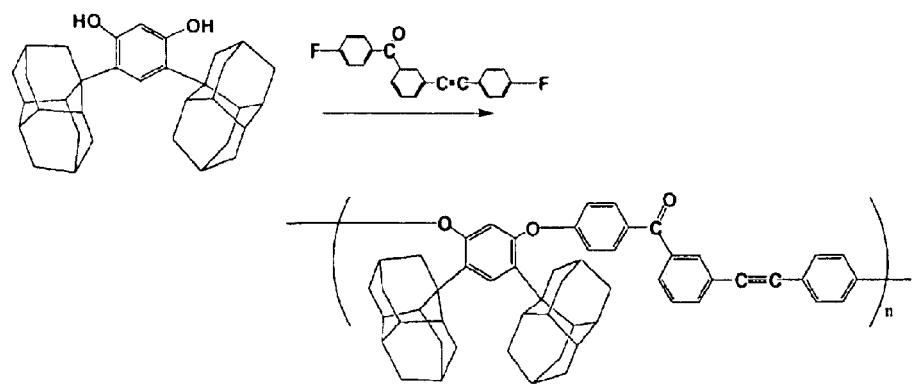
FIG. 2 is a synthetic scheme to produce another low molecular weight polymer with pendent cage structures according to the inventive subject matter.

Although preferably built from low molecular weight polymers with a molecular weight of approximately 1000 to 10000, the chain length of the first and second polymeric backbones may vary considerably between five, or less repeating units to several $10^4$ repeating units, and more. Preferred backbones are synthesized from monomers in an aromatic substitution reaction, and synthetic routes are shown by way of example in FIGS. 1 and 2. It is further contemplated that alternative backbones may also be branched, superbranched, or crosslinked at least in part. Alternatively, the backbones may also be synthesized in-situ from monomers. Appropriate monomers may preferably include aromatic bisphenolic compounds and difluoroaromatic compounds, which may have between 0 and about 20 built-in cage structures.

It is especially contemplated that appropriate monomers may have a tetrahedral structure, which are schematically depicted in Structures 2A–B. In general Structure 2A, a thermosetting monomer has a cage structure G, and at least two of the side chains $R_1$–$R_4$ comprise an aromatic portion and a reactive group, wherein at least one of the reactive groups of a first monomer reacts with at least one of the reactive group of a second monomer to produce a low dielectric constant polymer. In general Structure 2B a cage structure, preferably an adamantane, is coupled to four aromatic portions which may participate in polymerization, and wherein $R_1$–$R_4$ may be identical or different.

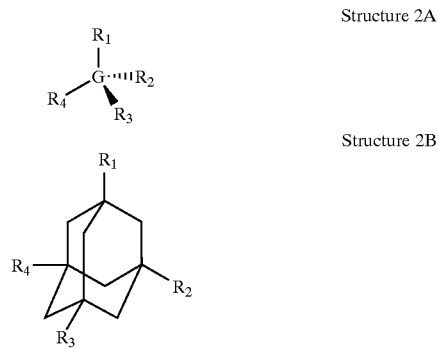

Structure 2A

Structure 2B

When monomers with tetrahedral structure are used, the cage structure will advantageously not only introduce a nanosized void, but also covalently connect four backbones in a three dimensional configuration. An exemplary monomer with tetrahedral structure and its synthesis is shown in FIG. 4B. It should further be appreciated that alternative monomers need not be limited to compounds with a substituted or unsubstituted adamantane as a cage structure, but may also comprise a substituted or unsubstituted diamantane, or fullerene as a cage structure. Contemplated substituents include alkyls, aryls, halogens, and functional groups. For example, an adamantane may be substituted with a —$CF_3$ group, a phenyl group, —COOH, —$NO_2$, or —F, —Cl, or —Br. Consequently, depending on the chemical nature of the cage structure, various numbers other than four aromatic portions may be attached to the cage structure. For example, where a relatively low degree of crosslinking through cage structures is desired, 1–3 aromatic portions may be attached to the cage structure, wherein the aromatic portions may or may not comprise a reactive group for crosslinking. In cases where higher degrees of crosslinking is preferred, five and more aromatic portions may be attached to a cage structure wherein all or almost all of the aromatic portions carry one or more than one reactive group. Furthermore, it is contemplated that aromatic portions attached to a central cage structure may carry other cage structures, wherein the cage structures may be identical to the central cage structure, or may be entirely different. For example, contemplated monomers may have a fullerene cage structure to provide a relatively high number of aromatic portions, and a diamantane in the aromatic portions. Thus, contemplated cage structures may be covalently bound to a first and second backbone, or to more than two backbones.

With respect to the chemical nature of the aromatic portion it is contemplated that appropriate aromatic portions comprise a phenyl group, and more preferably a phenyl group and a reactive group. For example, an aromatic portion may comprise a tolane, or a substituted tolane, wherein substituted tolanes may comprise additional phenyl groups covalently bound to the tolane via carbon-carbon bonds, or carbon-non-carbon atom bonds, including double and triple bonds, ether-, keto-, or ester groups.

Figure 4A:
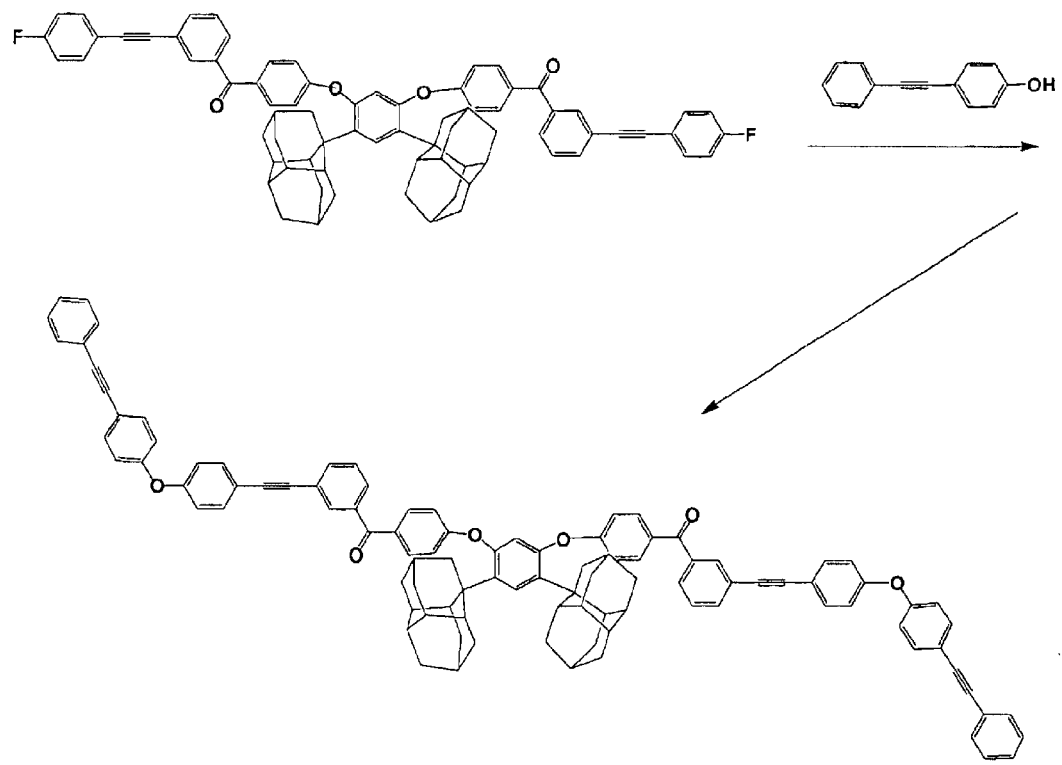
FIGS. 4A–B are synthetic schemes to produce various thermosetting monomers according to the inventive subject matter.
Figure 4B:
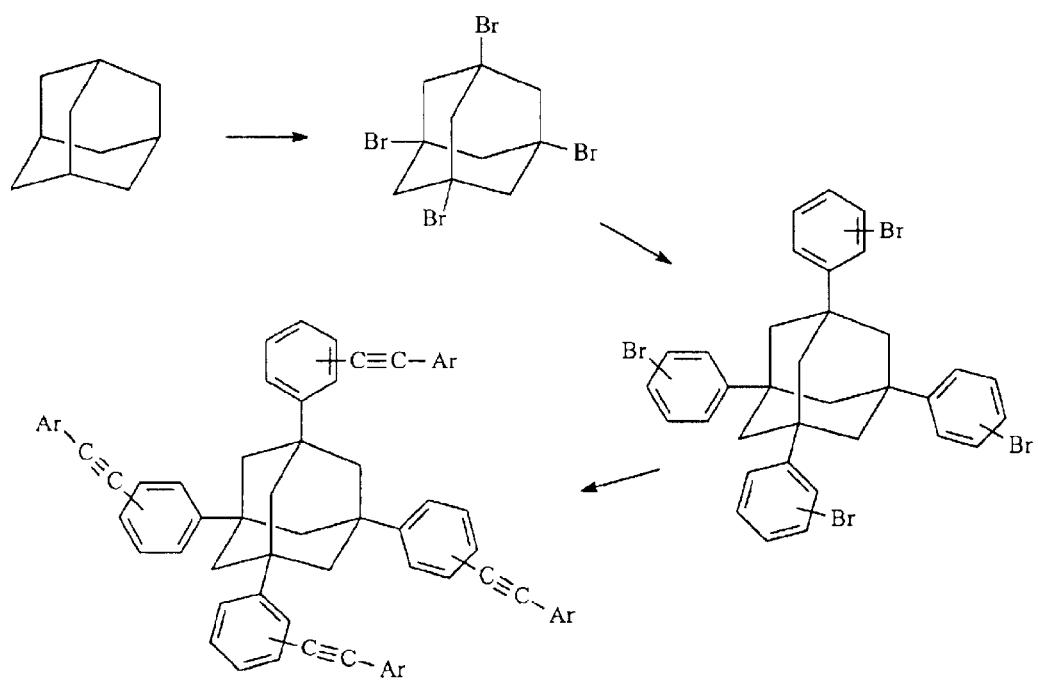

Also contemplated are monomers that have pendent cage structures, as depicted by way of example in FIG. 4A, in which two diamantane groups are utilized as pendent groups. It should be appreciated, however, that pending cage structures are not limited to two diamantane structures. Contemplated alternative cage structures include single and multiple substituted adamantane groups, diamantane groups and fullerenes in any chemically reasonable combination. Substitutions may be introduced into the cage structures in cases where a particular solubility, oxidative stability, or other physico-chemical properties is desired. Therefore, contemplated substitutions include halogens, alkyl, aryl, and alkenyl groups, but also functional and polar groups including esters, acid groups, nitro and amino groups, and so forth.

It should also be appreciated that the backbones need not be identical. In some aspects of alternative embodiments, two, or more than two chemically distinct backbones may be utilized to fabricate a low dielectric constant material, as long as the alternative low dielectric constant material comprises first and second backbones having an aromatic moiety, a reactive group, and a cage compound covalently bound to the backbone.

With respect to the reactive groups it is contemplated that many reactive groups other than an tolanyl group and a tetracyclone group may be employed, so long as alternative reactive groups are able to crosslink first and second backbones without an exogenous crosslinker. For example, appropriate reactive groups include benzocyclobutenyl, and biphenylene. In another example, a first reactive group may comprise an electrophile, while a second reactive group may comprise a nucleophile. It is further contemplated that the number of reactive groups predominantly depends on (a) the reactivity of the first and second reactive group, (b) the strength of the crosslink between first and second backbone, and (c) the desired degree of crosslinking in the low dielectric material. For example, when the first and second reactive groups are sterically hindered (e.g. an ethynyl group between two derivatized phenyl rings), a relatively high number of reactive groups may be needed to crosslink two backbones to a certain extent. Likewise, a high number of reactive groups may be required to achieve stable crosslinking when relatively weak bonds such as hydrogen bonds or ionic bonds are formed between the reactive groups.

In cases where a reactive group in one backbone is capable of reacting with an identical reactive group in another backbone, only one type of reactive group may be needed. For example, tolanyl groups located on the same of two different backbones may react in an addition-type reaction to form crosslinking structures.

It should also be appreciated that the number of reactive groups may influence the ratio of intermolecular to intramolecular crosslinking. For example, a relatively high concentration of reactive groups in first and second backbones at a relatively low concentration of both backbones may favor intramolecular reactions. Similarly, a relatively low concentration of reactive groups in first and second backbones at a relatively high concentration of both backbones may favor intermolecular reactions. The balance between intra- and intermolecular reactions may also be influenced by the distribution of non-identical reactive groups between the backbones. When an intermolecular reaction is desired, one type of reactive group may be placed on the first backbone, while another type of reactive group may be positioned on the second backbone. Furthermore, additional third and fourth reactive groups may be employed when sequential crosslinking at different conditions is desired (e.g. two different temperatures).

The reactive groups of preferred backbones react in an addition-type reaction, however, depending on the chemical nature of alternative reactive groups, many other reactions are also contemplated, including nucleophilic and electrophilic substitutions, or eliminations, radical reactions, etc. Further alternative reactions may also include the formation of non-covalent bonds, such as electrostatic bonds, hydrophobic bonds, ionic bonds and hydrogen bonds. Thus, crosslinking the first and second backbone may occur via a covalent or non-covalent bond formed between identical or non-identical reactive groups, which may be located on the same or two backbones.

Figure 3A:
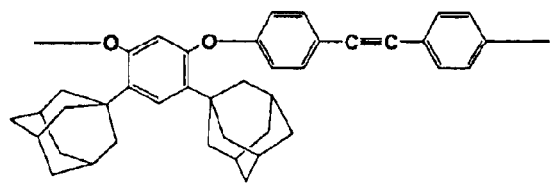
FIGS. 3A–B are structures of various polymers according to the inventive subject matter.
Figure 3B:
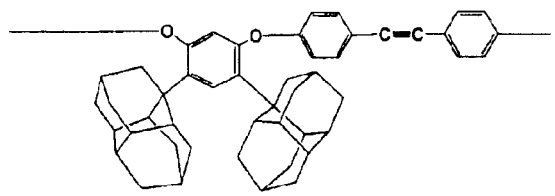

In further aspects of alternative embodiments, the cage structure may comprise structures other than an adamantane, including a diamantane, bridged crown ethers, or fullerenes, as long as alternative cage structures have 10 or more atoms. The selection of appropriate cage structures is determined by the desired degree of steric demand of the cage structure. If relatively small cage structures are preferred, a single adamantane, or diamantane group may be sufficient. Exemplary structures of backbones including adamantane and diamantane groups are shown in FIGS. 3A and 3B. Large cage structures may comprise fullerenes. It should also be appreciated that alternative backbones need not be limited to a single type of cage structure. Appropriate backbones may also include 2–5, and more non-identical cage structures. For example, fullerenes may be added to one or both ends of a polymeric backbone, while diamantane groups are placed in the other parts of the backbone. Further contemplated are derivatized, or multiple cage structures, including oligomerized and polymerized cage structures, where even larger cage structures are desired. The chemical composition of the cage structures need not be limited to carbon atoms, and it should be appreciated that alternative cage structures may have atoms other than carbon atoms (i.e. heteroatoms), whereby contemplated heteroatoms may include N, O, P, S, B, etc.

Figure 5A:
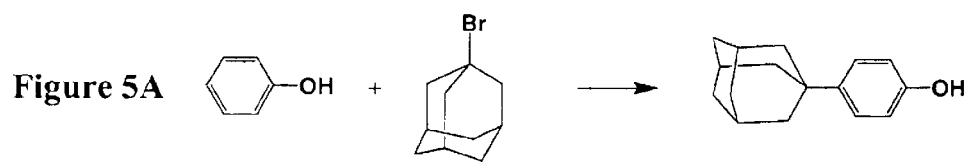
FIGS. 5A–B are synthetic schemes to produce an end-capping molecule with pendent cage structures according to the inventive subject matter.

With respect to the position of the cage structure it is contemplated that the cage structure may be connected to the backbone in various locations. For example, when it is desirable to mask terminal functional groups in the backbone, or to terminate a polymerization reaction forming a backbone, the cage structure may be employed as an end-cap. Exemplary structures of end-caps are shown in FIGS. 5A and B. In other cases where large amounts of a cage structure are desired, it is contemplated that the cage structures are pendent structures covalently connected to the backbone. The position of the covalent connection may vary, and mainly depends on the chemical make-up of the backbone and the cage structure. Thus, appropriate covalent connections may involve a linker molecule, or a functional group, while other connections may be a single or double bond. When the cage group is a pendent group it is especially contemplated that more than one backbone may be connected to the cage structure. For example, a single cage structure may connect 2–3, and more backbones. Alternatively, it is contemplated that the cage group may be an integral part of the backbone.

It is still further contemplated that alternative low dielectric constant material may also comprise additional components. For example, where the low dielectric constant material is exposed to mechanical stress, softeners or other protective agents may be added. In other cases where the dielectric material is placed on a smooth surface, adhesion promoters may advantageously employed. In still other cases the addition of detergents or antifoam agents may be desirable.

Figure 6:
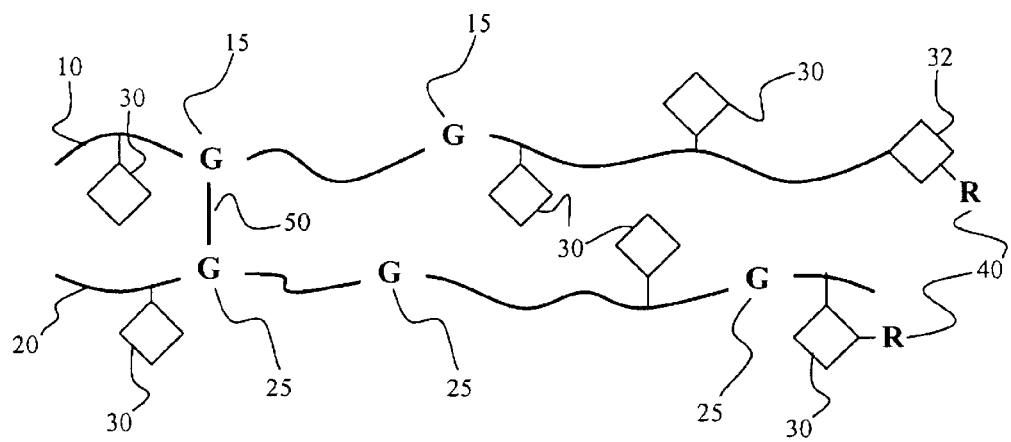
FIG. 6 is schematic structure of an exemplary low dielectric constant material according to the inventive subject matter.

Turning now to FIG. 6, an exemplary low dielectric constant material is shown in which a first backbone 10 is crosslinked to a second backbone 20 via a first reactive group 15 and a second reactive group 25, wherein the crosslinking results in a covalent bond 50. Both backbones have at least one aromatic moiety (not shown), respectively. A plurality of pendent cage structures 30 are covalently bound to the first and second backbones, and the first backbone 10 further has a terminal cage group 32. The terminal cage group 32, and at least one of the pendent cage groups 30 carries at least one substituent R 40, wherein substituent 40 may be a halogen, alkyl, or aryl group. Each of the cage structures comprises at least 10 atoms.

EXAMPLES

The following examples describe exemplary synthetic routes for production of backbones having cage-like structures.

Example 1

Synthesis of 4,6-bis(adamantyl)resorcinol

Into a 250-mL 3-neck flask, equipped with nitrogen inlet, thermocouple and condenser, were added resorcinol (11.00 g, 100.0 mMol), bromoadmantane (44.02 g, 205.1 mMol) and toluene (150 mL). The mixture was heated to 110° C. and became a clear solution. The reaction was allowed to continue for 48 h, at which time TLC showed that all the resorcinol had disappeared. The solvent was removed and the solid was crystallized from hexanes (150 mL). The disubstituted product was obtained in 66.8% yield (25.26 g) as a white solid. Another 5.10 g product was obtained by silica gel column chromatography of the concentrated mother liquor after the first crop. The total yield of the product was 80.3%. Characterization of the product was by proton NMR, HPLC, FTIR and MS.

Incorporation of 4,6-bis(adamantyl)resorcinol into a poly(arylene ether) backbone

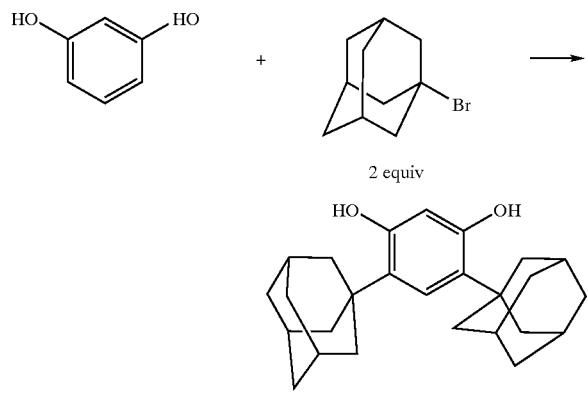

In a 250-mL 3-neck flask, equipped with a nitrogen inlet, thermocouple and Dean-Stark trap, were added bis(adamantyl)resorcinol (7.024 g, 18.57 mMol), FBZT (5.907 g, 18.57 mMol), potassium carbonate (5.203 g, 36.89 mMol) and DMAC (50 mL), toluene (25 mL). The reaction mixture was heated to 135° C. to produce a clear solution. The reaction was continued for 1 h at this temperature and the temperature was raised to 165° C. by removing some of the toluene. The course of polymerization was monitored by GPC. At $M_w$=22,000, the reaction was stopped. Another 50-mL portion of DMAC was added to the reaction flask. The solid was filtered at room temperature, and was extracted with hot dichloromethane (2×150 mL). Methanol (150 mL) was added to the solution to precipitate a white solid, which was isolated by filtration. The yield was 65.8% (8.511 g). The solid was dissolved in THF (150 mL) and methanol (300 mL) was added to the solution slowly. The precipitated white solid was isolated by filtration and dried in vacuo at 90° C.

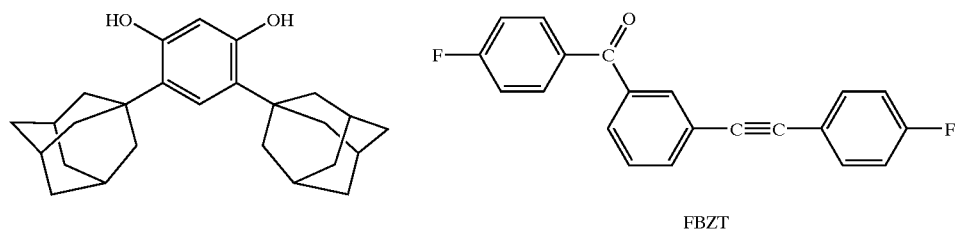

FBZT

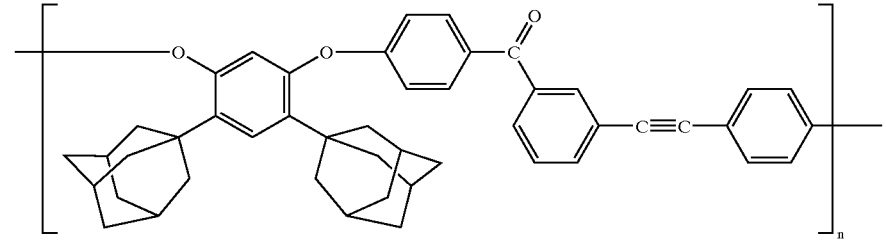

Example 3

Synthesis of alternative polymers

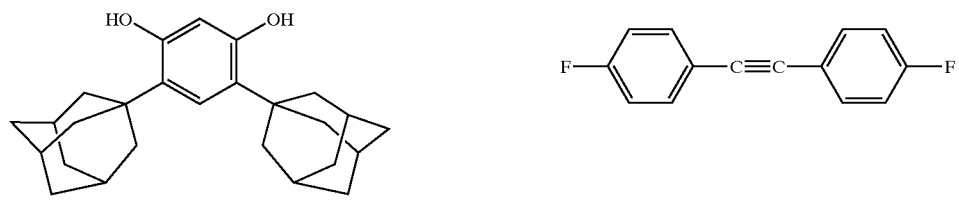

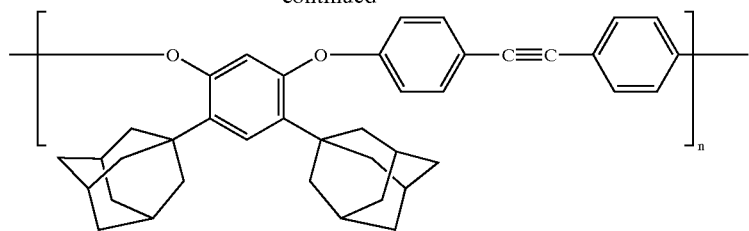

The synthetic procedure for backbone 1 follows the procedure as described in Example 2, but employs 4,4'-difluorotolane as the difluoro compound.

Example 4

Contemplated Alternative Backbones

The following structures are contemplated exemplary backbones that can be fabricated according to the general synthetic procedure in Examples 1 and 2.

Example 5

This example demonstrates an exemplary synthesis for a thermosetting monomer as depicted in FIG. 4B according to the inventive subject matter.

Synthesis of 1,3,5,7-tetrabromoadamantane

Tetrabromoadamantane synthesis started from commercially available adamantane and followed the synthetic procedures as described in G. P. Sollott and E. E. Gilbert, J. Org. Chem., 45, 5405–5408 (1980), B. Schartel, V. St

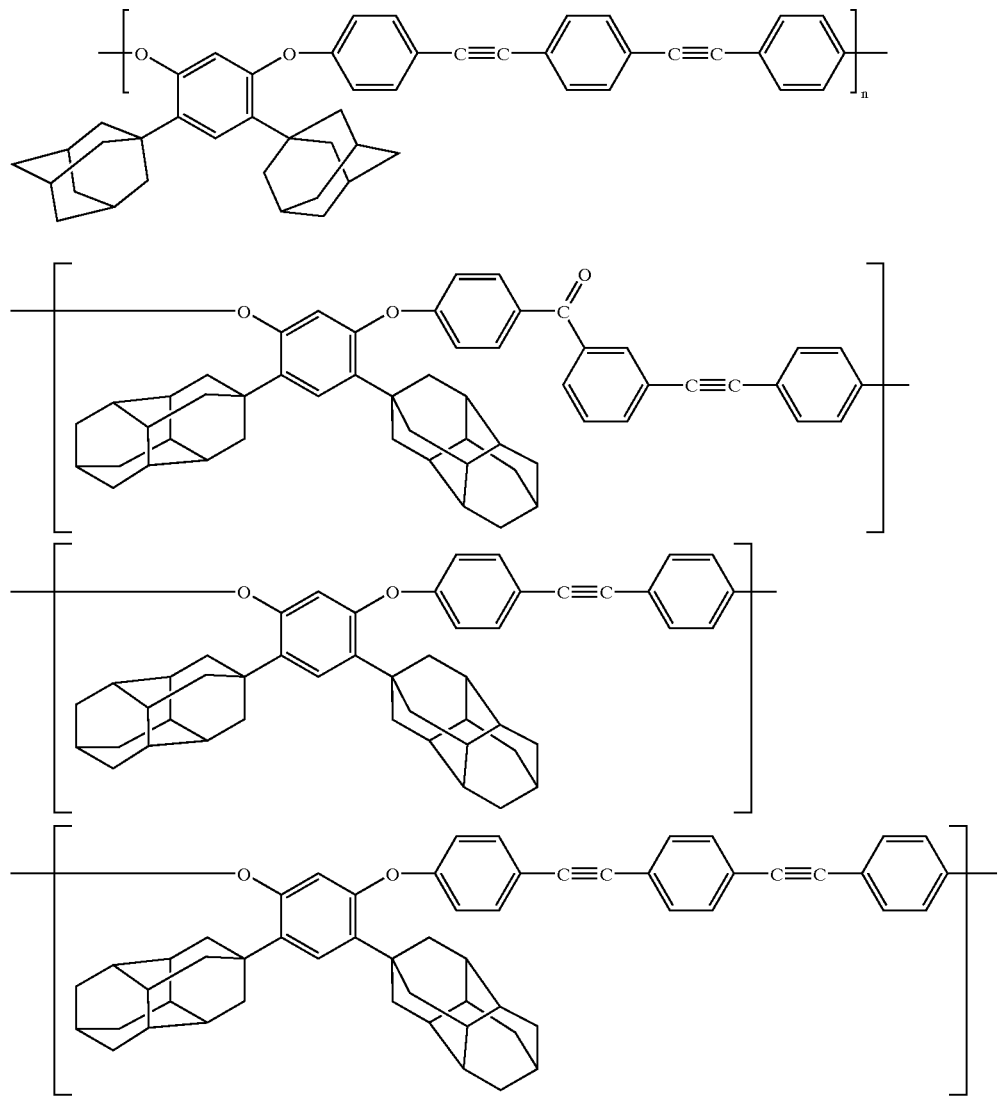

ümpflin, J. Wendling, J. H. Wendorff, W. Heitz, and R. Neuhaus, Colloid Polym. Sci., 274, 911–919 (1996), or A. P. Khardin, I. A. Novakov, and S. S. Radchenko, Zh. Org. Chem., 9, 435 (1972). Quantities of up to 150 g per batch were routinely synthesized.

Synthesis of 1,3,5,7-tetrakis(3/4-bromophenyl) adamantane 1,3,5,7-tetrakis(3/4-bromophenyl)adamantane was synthesized from 1,3,5,7-tetrabromoadamantane following a procedure as described elsewhere (V. R. Reichert and L. J. Mathias, Macromolecules, 27, 7015–7023 (1994), V. R. Reichert, Ph. D. Dissertation, "Investigation of derivatives and polymers of 1,3,5,7-tetraphenyladamantane," University of Southern Mississippi, 1994). LC-MS was used to identify the components of the isomeric mixture after the first synthesis. Treating the reaction product with fresh AlBr$_3$ catalyst favored the composition of the isomeric mixture kinetically the one that was enriched in Ph4Br4 isomer.

Synthesis of 1,3,5,7-tetrakis(3/4-tolanyl)adamantane 1,3,5,7-tetrakis(3/4-tolanyl)adamantane was synthesized from 1,3,5,7-tetrakis(3/4-bromophenyl)adamantane by reacting 1,3,5,7-tetrakis(3/4-bromophenyl)adamantane in triethylamine with an about nine-fold molar excess of phenylacetylene in the presence of Pd catalyst dichlorobis (triphenylphosphine)palladium[II] and copper[I] iodide for 4 hours at 80° C.

Example 6

Figure 5B:
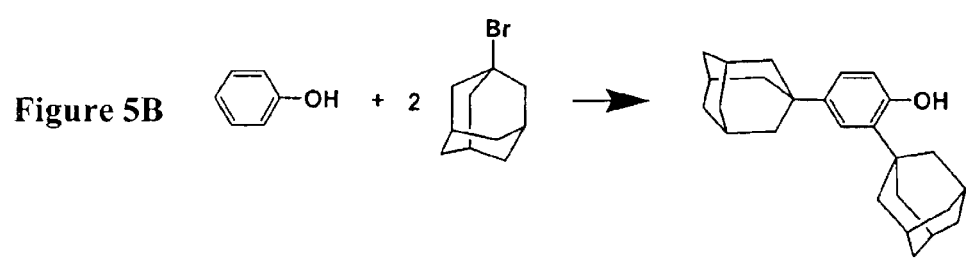

Adamantanyl endcapped monomers as shown in FIGS. 5A and 5B were synthesized as described in C. M. Lewis, L. J. Mathias, N. Wiegal, ACS Polymer Preprints, 36(2), 140 (1995).

Thus, specific embodiments, applications, and methods for producing low dielectric constant dielectrics having cage-like structures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A low dielectric constant material, comprising:
   a first backbone having a first aromatic moiety and a first reactive group;
   a second backbone having a second aromatic moiety and a second reactive group wherein
      the first and second backbones are crosslinked via the first and second reactive groups in a crosslinking reaction, wherein the reaction is a cycloaddition; and
   wherein at least one of the first or second backbones comprises at least one thermosetting monomer having the formula:

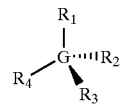

wherein G is a cage structure, and wherein $R_1$–$R_4$ comprises an alkyl group, an aryl group, a halogen atom, $CF_3$, COOH, or $NO_2$, wherein at least two of $R_1$–$R_4$ comprises an aromatic portion and a reactive group, and wherein the reactive group on the at least one thermosetting monomer may comprise the first reactive group or the second reactive group.

2. The low dielectric constant material of claim 1, wherein the cage structure comprises at least one of an adamantane and a diamantane.

3. A layer comprising said low dielectric constant polymer of claim 1.

4. The layer of claim 3, wherein said aromatic portion comprises phenyl.

5. The layer of claim 3, wherein said cage structure comprises substituted or unsubstituted adamantane or substituted or unsubstituted diamantane.

6. A film comprising said low dielectric constant material of claim 1.

7. The film of claim 6, wherein the thickness of the film is less than 100 μm.

8. The film of claim 6, wherein the dielectric constant is less than 3.

9. The film of claim 6, wherein said cage structure comprises substituted or unsubstituted adamantane or substituted or unsubstituted diamantane.

10. An insulator comprising said low dielectric constant material of claim 1.

11. The insulator of claim 10, wherein said aromatic portion comprises phenyl.

12. The insulator of claim 10, wherein said cage structure comprises substituted or unsubstituted adamantane or substituted or unsubstituted diamantane.

13. An integrated circuit comprising the layer of claim 3.

14. An integrated circuit comprising the film of claim 6.

15. An integrated circuit comprising the insulator of claim 10.

* * * * *